(12) United States Patent
Systermans

(10) Patent No.: US 12,535,894 B1
(45) Date of Patent: Jan. 27, 2026

(54) AUTONOMOUS BOOK WITH NON-DIGITAL SCREEN AND LASER PROJECTORS

(71) Applicant: Casille Systermans, Gwynn Oak, MD (US)

(72) Inventor: Casille Systermans, Gwynn Oak, MD (US)

( * ) Notice: Subject to any disclaimer, the term of this patent is extended or adjusted under 35 U.S.C. 154(b) by 0 days.

(21) Appl. No.: 19/281,656

(22) Filed: Jul. 26, 2025

(51) Int. Cl.
*G06F 3/03* (2006.01)
*G06F 3/0354* (2013.01)

(52) U.S. Cl.
CPC ........ *G06F 3/0325* (2013.01); *G06F 3/03545* (2013.01)

(58) Field of Classification Search
CPC .......................... G06F 3/03545; G06F 3/0325
See application file for complete search history.

(56) References Cited

U.S. PATENT DOCUMENTS

| | | | | |
|---|---|---|---|---|
| 2017/0285850 | A1* | 10/2017 | Amo | G06F 3/0484 |
| 2019/0286245 | A1* | 9/2019 | Ikeda | G06F 3/017 |
| 2020/0293146 | A1* | 9/2020 | Ferris | G06F 1/1601 |
| 2025/0224822 | A1* | 7/2025 | Quan | G06F 3/03545 |

* cited by examiner

*Primary Examiner* — Muhammad N Edun
(74) *Attorney, Agent, or Firm* — Michael D. Eisenberg

(57) ABSTRACT

An autonomous note book with non-digital screens including integrated laser projectors located on the non-digital screens and connected to a machine-learning (ML) module configured to interpret movements of a stylus over the non-digital screens and to generate printable transcribed text or drawings. The autonomous note book has CPU with a processor configured to run the ML module and connected to at least one integrated laser projector and to at least one sensor and a memory on which are stored machine-readable instructions that when executed by the processor, cause the processor to: receive stylus movement data from the at least one laser projector and at least one sensor integrated within the at least one integrated laser projector; parse the stylus movement data to derive a plurality of key classifying features; query a local database to retrieve local historical stylus movements-related data based on the plurality of key classifying features; generate at least one classifier feature vector based on the plurality of key classifying features and the local historical stylus movements-related data; provide the at least one feature vector to the ML module coupled to an Artificial Neural Network (ANN); receive a plurality of stylus movement parameters from a stylus movement interpretation predictive model generated by the ML module using outputs of the ANN based on the at least one feature vector; and generate a viewable content based on the plurality of stylus movement parameters.

20 Claims, 8 Drawing Sheets

AUTONOMOUS BOOK WITH NON-DIGITAL SCREEN AND LASER PROJECTORS

FIELD OF DISCLOSURE

The present disclosure generally relates to a note books, and more particularly, to an autonomous note book with non-digital screens and laser projectors connected to a machine-learning module that interprets movements of stylus and generates printable transcribed text or drawings.

BACKGROUND

Variety of digital notebooks exist. For example, U.S. Pat. No. 11,640,238 B2 discloses a method for controlling a portable device including first and second touch screens is provided. The method includes displaying first information related to a first application on the first touch screen and displaying second information related to the first application on the second touch screen; receiving a first user input moving to the first touch screen on the second touch screen; and replacing the first information and the second information with a third information and a fourth information related to the first application on the first and second touch screens, in response to receiving the first user input, wherein each of the third information and the fourth information is displayed while being slidden from the second touch screen to the first touch screen and the third information is displayed over a boundary between the first and second screens during the sliding of the third and fourth information.

As another example, U.S. Pat. No. 9,626,075 B1 discloses an electronic book reader that has an electronic book loaded in memory. The electronic book includes text, as well as markup tags around certain text portions. The markup tags indicate the availability of and link to supplemental content. A touch screen display allows a user to select a category of supplemental content or linked text. The display will show links for the category of content selected by the user, or will show categories of content for the linked text selected by the user.

Yet, as another example U.S. Pat. No. 10,108,077B2 discloses a light source apparatus includes a first light source section that outputs blue light along a first illumination optical axis, the second light source section are arranged side by side and outputs excitation light along a second illumination optical axis substantially parallel to the first illumination optical axis, a reflection member that reflects the excitation light in such a way that the reflected excitation light travels along a third illumination optical axis that intersects the first illumination optical axis and the second illumination optical axis, a wavelength converter on which reflects converted light having a wavelength different from a wavelength of the excitation light, and a light combiner that is located in the position where the first illumination optical axis and the third illumination optical axis intersect each other and transmits the blue light and the excitation light but reflects the converted light.

As yet another example, U.S. Pat. No. 11,762,546 B2 discloses an electronic device, with a display and one or more input devices separate from the display, displays, on the display, a user interface for an application. The device receives, at the one or more input devices separate from the display, user input events. The device generates a plurality of separate event streams in accordance with the user input events. The device merges information from the plurality of separate event streams to generate a stream of merged user input events. The device provides, to the application, information that describes the stream of merged user input events. The device displays, on the display, a response by the application that is based at least in part on the information that describes the stream of merged user input events.

However, the conventional applications do not address the use of a non-digital screen with a laser projection of the text and an operating system configured to run AI for interpretation of movements of movements of stylus.

Accordingly, an autonomous note book with non-digital screens and laser projectors connected to a machine-learning module running on the removable hard-drive that interprets movements of a stylus and generates printable transcribed text or drawings and method for AI-based real-time interpretation of movements of the stylus are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides an autonomous note book with non-digital screens including integrated laser projectors located on the non-digital screens and connected to a machine-learning (ML) module configured to interpret movements of a stylus over the non-digital screens and to generate printable transcribed text or drawings. The autonomous note book has CPU with a processor configured to run the ML module and connected to at least one integrated laser projector and to at least one sensor and a memory on which are stored machine-readable instructions that when executed by the processor, cause the processor to: receive stylus movement data from the at least one laser projector and at least one sensor integrated within the at least one integrated laser projector; parse the stylus movement data to derive a plurality of key classifying features; query a local database to retrieve local historical stylus movements-related data based on the plurality of key classifying features; generate at least one classifier feature vector based on the plurality of key classifying features and the local historical stylus movements-related data; provide the at least one feature vector to the ML module coupled to an Artificial Neural Network (ANN); receive a plurality of stylus movement parameters from a stylus movement interpretation predictive model generated by the ML module using outputs of the ANN based on the at least one feature vector; and generate a viewable content based on the plurality of stylus movement parameters.

Another embodiment of the present disclosure provides a method executed by the processor of the autonomous notebook that includes one or more of the steps: receiving, by a processor of the autonomous note book configure to host a machine learning (ML) module, stylus movement data from the at least one laser projector and at least one sensor integrated within the at least one integrated laser projector; parsing, by the processor, the stylus movement data to derive a plurality of key classifying features; querying, by the processor, a local database to retrieve local historical stylus movements-related data based on the plurality of key classifying features; generating, by the processor, at least one classifier feature vector based on the plurality of key classifying features and the local historical stylus movements-related data; providing, by the processor, the at least one feature vector to the ML module coupled to an Artificial Neural Network (ANN); receiving, by the processor, a plurality of stylus movement parameters from a stylus movement interpretation predictive model generated by the ML module using outputs of the ANN based on the at least one feature vector; and generating, by the processor, a viewable content based on the plurality of stylus movement parameters.

Another embodiment of the present disclosure provides a computer-readable medium including instructions for receiving stylus movement data from the at least one laser projector and at least one sensor integrated within the at least one integrated laser projector; parsing the stylus movement data to derive a plurality of key classifying features; querying a local database to retrieve local historical stylus movements-related data based on the plurality of key classifying features; generating at least one classifier feature vector based on the plurality of key classifying features and the local historical stylus movements-related data; providing the at least one feature vector to the ML module coupled to an Artificial Neural Network (ANN); receiving a plurality of stylus movement parameters from a stylus movement interpretation predictive model generated by the ML module using outputs of the ANN based on the at least one feature vector; and generating a viewable content based on the plurality of stylus movement parameters.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
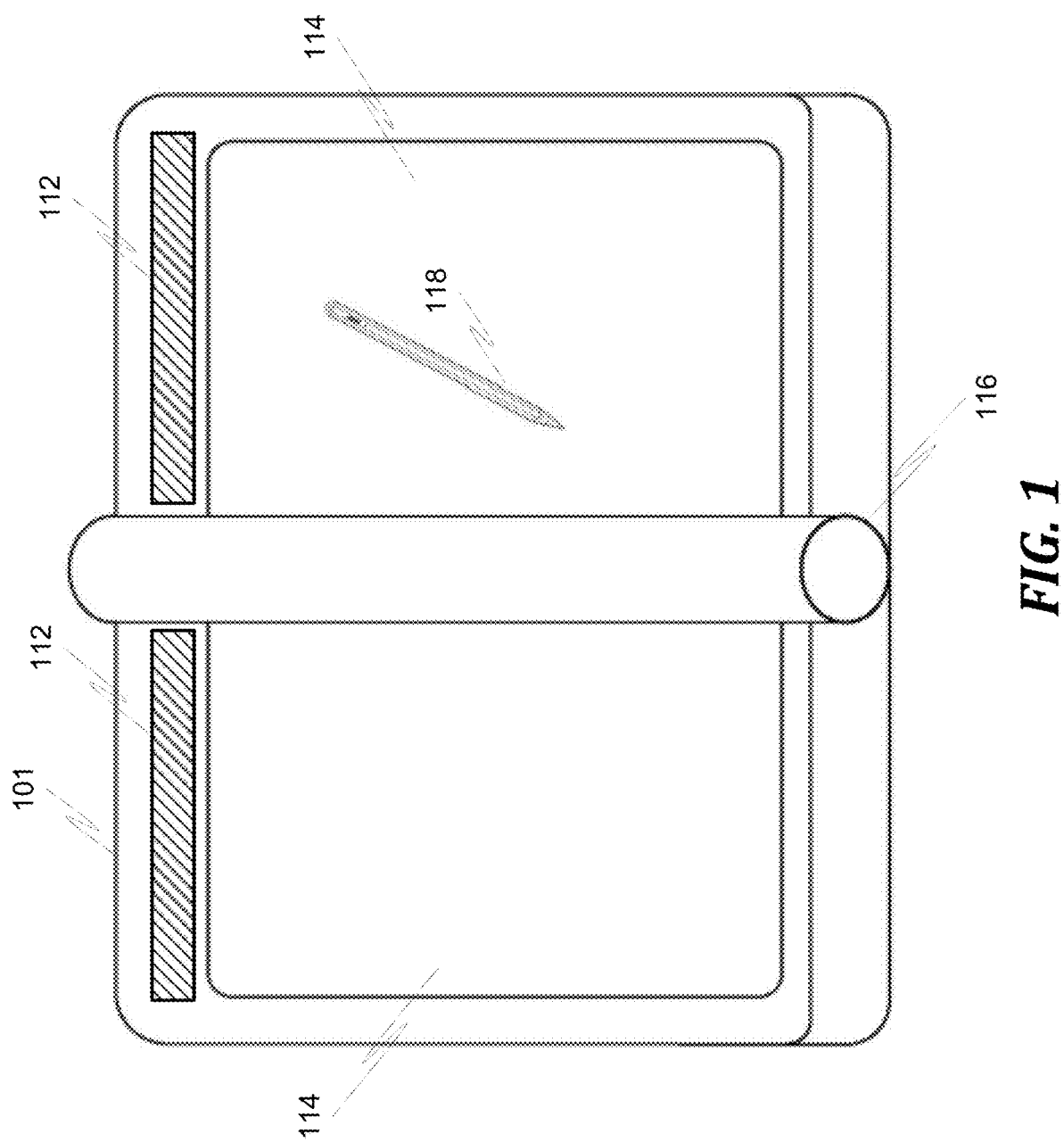
FIG. 1 illustrates a note book with non-digital screens and integrated laser projectors and sensors consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of stylus movement interpretation parameters parameter, embodiments of the present disclosure are not limited to use only in this context.

The following definitions may be used in the present disclosure.

"A classifier feature vector" refers to a mathematical representation of the key classifying features, typically in the form of an n-dimensional vector where each dimension corresponds to a specific feature. This vector is used as input for machine learning algorithms to categorize or analyze the stylus data.

"A stylus movement interpretation predictive model" refers to machine learning model trained on historical stylus movements-related data to predict various outcomes or characteristics for content rendering via integrated laser projectors. This model takes the feature vector as input and outputs predictions about a set of interpretations of stylus movements.

"Pre-set threshold value" refers to a predetermined numerical value used as a decision boundary for triggering actions within the disclosed system. This value may be set based on historical data, expert knowledge, or specific data processing requirements.

The present disclosure provides a system, method and computer-readable medium for AI-based automated real-time interpretations based on predictive analytics of stylus movement data. In one embodiment, the system overcomes the limitations of existing methods by employing fine-tuned models to ingest and process the stylus movement data, irrespective of data format, style, or data type. By leveraging the capabilities of the pre-trained predictive models, the disclosed approach offers a significant improvement over existing solutions discussed above in the background section.

As discussed above, in one embodiment of the present disclosure, the system provides for an AI and machine learning (ML)-generated stylus movement interpretation predictive model based on analysis of stylus movement data. The stylus movement interpretation predictive model may use historical stylus-related data collected at the current note book and at note books of the same type located within a certain range from the current location or even located globally. The relevant historical stylus-related data may include data related to other stylus having the same parameters such as size and type, etc. The relevant stylus-related data may indicate successfully implemented movement interpretations based on predictive analytics and associated successful usage of stylus.

In one embodiment, to enhance this process, the system may integrate advanced technologies discussed above, such as Artificial Intelligence (AI) and machine-learning (ML) and Blockchain. The AI may be leveraged for several key functions discussed herein.

Additionally, the disclosed note book system may incorporate Blockchain technology to ensure the transparency and immutability of transactions, providing a secure and trustworthy platform. By embedding these advanced technologies, the disclosed automated system, advantageously, offers a sophisticated and secure solution.

As discussed above, in one disclosed embodiment, the AI/ML technology may be combined with a blockchain technology for secure use of the stylus-related data and movement interpretation data. In one embodiment, the ML module may use the stylus movement interpretation predictive model(s) that use an artificial neural network (ANN), a non-linear modeling approach to extract quantitative features from the stylus movement data to generate predictive stylus movement parameters. The use of specially trained ANNs provides a number of improvements over traditional methods of analyzing of movement data received from the stylus, including more accurate prediction of stylus-related movement interpretations to be generated in the future. The application further provides methods for training the ANN that leads to a more accurate use of the stylus movement interpretation predictive model(s).

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network that has an input layer, an output layer, attention-mechanism blocks, convolutional blocks, residual blocks, and several fully connected hidden layers. The proposed ANN may be particularly useful for stylus movement interpretation predictive model generation because the ANN can effectively extract features from the stylus movement data in linear and non-linear relationships. In some embodiments, the proposed ANN may be implemented by an application-specific integrated circuit (ASIC). The ASICs may be specially designed and configured for a specific AI application and provide superior computing capabilities and reduced electricity and computational resources consumption compared to the traditional CPUs.

Accordingly, the disclosed embodiments provide a dynamic, closed-loop system for generating, evaluating, and continuously optimizing stylus movement interpretations involving neural networks.

FIG. 1 illustrates a note book with non-digital screens and integrated laser projectors and sensors consistent with the present disclosure.

Referring to FIG. 1, the example illustrates a diagram of a note book 101 with non-digital screens 114 and integrated laser projectors 112 and sensors (not shown). The sensors are configured to detect movements of stylus 118. Once the movement of the stylus 118 are captured through integrated laser projectors 112 and the sensors, a corresponding visual content may be projected and displayed on the non-digital screens 114 by the integrated laser projectors 112. A removable hard drive may be placed inside the compartment 116. The removable hard drive (not shown) may host a Machine Learning (ML) module configured to interpret the stylus 118 movements. In one embodiment, the user 111 may just use his/her finger or a pensile.

Figure 1A:
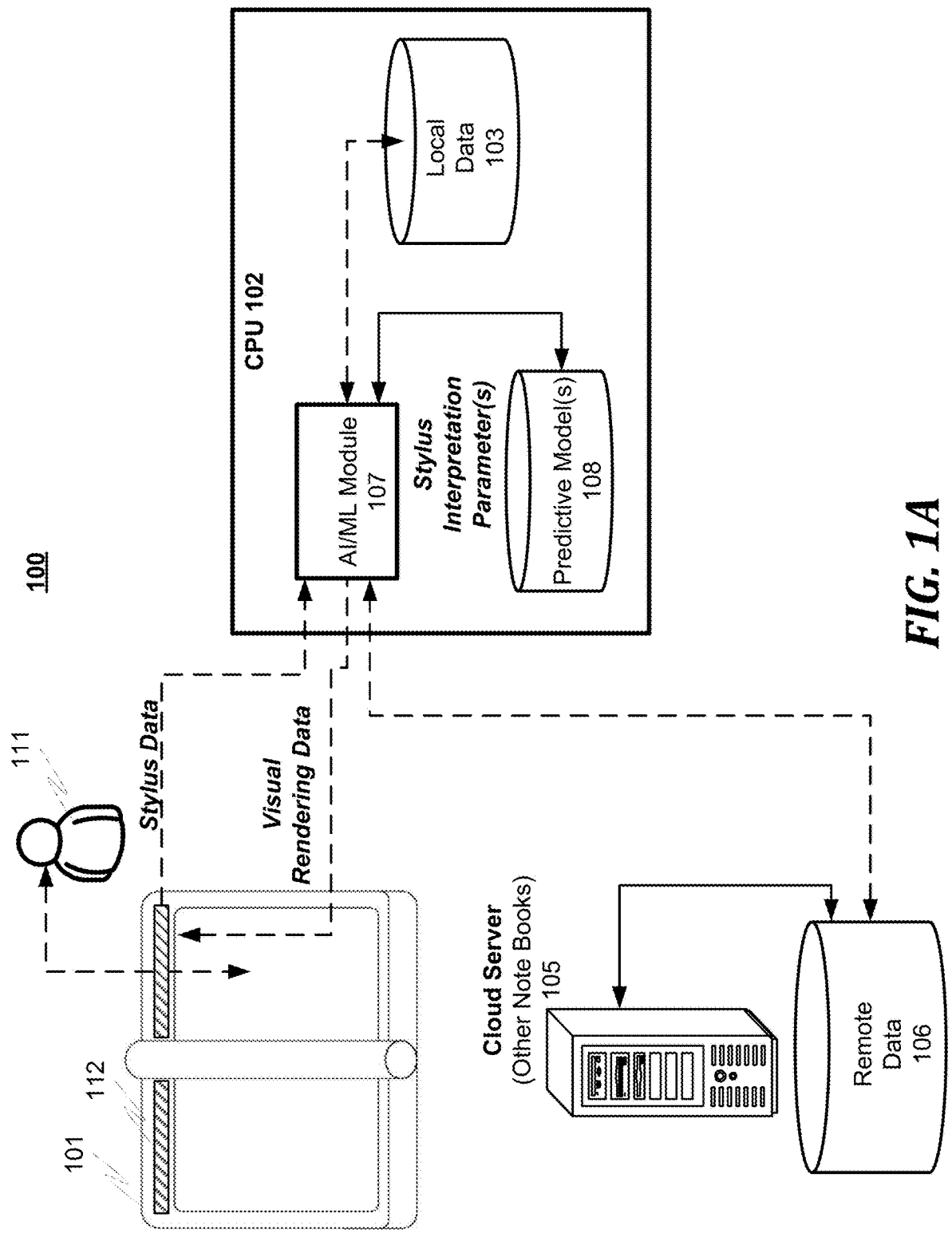
FIG. 1A illustrates a diagram of a note book with non-digital screens and integrated laser projectors and sensors system that uses AI/Machine-Learning module for real-time interpretation of stylus movements consistent with the present disclosure.

FIG. 1A illustrates a diagram of a note book with non-digital screens and integrated laser projectors and sensors system that uses AI/Machine-Learning module for real-time interpretation of stylus movements consistent with the present disclosure.

Referring to FIG. 1A, the example diagram 100 includes the note book 101 with non-digital screens 114 (FIG. 1) and integrated laser projectors 112 use by a user 111. The note book 101 has a CPU 102 connected (optionally) to a cloud server node(s) 105 over a network. The CPU 102 is configured to host an AI/ML module 107 configured to generate a predictive model 108. The CPU 102 may receive stylus movement data as the user 111 moves the stylus 118. In one embodiment, the user 111 may just use his/her finger or a pensile.

The CPU 102 may query a stylus data database 103 for the historical local stylus-related data based on the stylus movement data associated with the current user 111. The CPU 102 may acquire relevant remote stylus-related data from a remote database 106 residing on the cloud server 105. The stylus-related data in the database 106 may be collected from other styluses at different note books of the same type.

The CPU 102 may generate a feature vector or classifier data based on the stylus data and the collected heuristics data (i.e., pre-stored local data 103 and remote data 106). The CPU 102 may ingest the feature vector/classifier data into an AI/ML module 107. The AI/ML module 107 may generate a predictive model(s) 108 such as stylus movement interpretation predictive model based on the feature vector/classifier data to generate stylus movement parameters for automatic generation of the viewable content based on the plurality of stylus movement parameters. The stylus movement parameters may be further analyzed by the CPU 102 prior to the generation or rendering of the viewable content (drawings or text). In one embodiment, the viewable content may be in a form of a keyboard. The position of the stylus 118 (or the user 111 finger) over the keyboard may be detected in the similar manner described above.

Figure 1B:
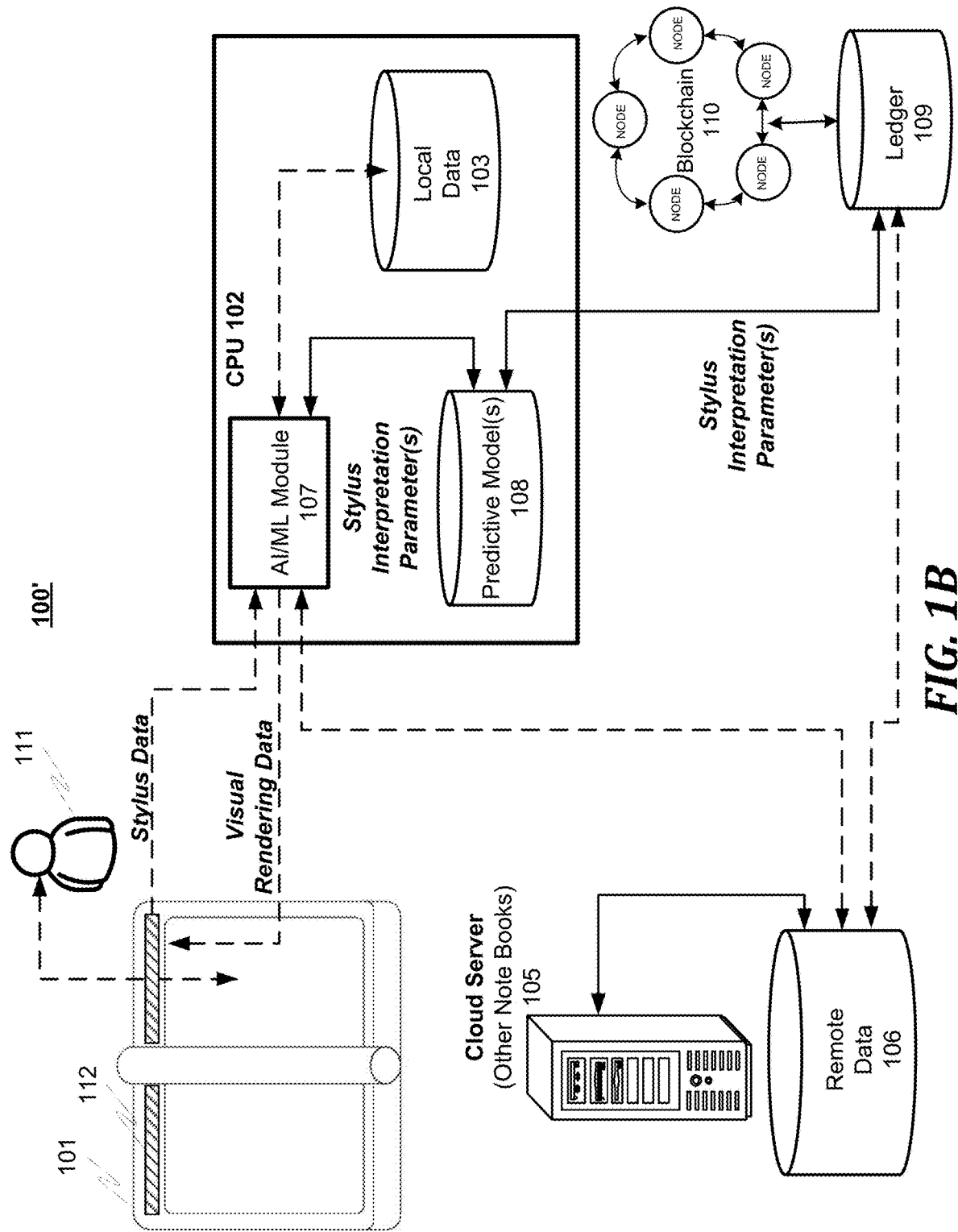
FIG. 1B illustrates a diagram of a note book with non-digital screens and integrated laser projectors and sensors system that uses AI/Machine-Learning module for real-time interpretation of stylus movements implemented over a blockchain network consistent with the present disclosure.

FIG. 1B illustrates a diagram of a note book with non-digital screens and integrated laser projectors and sensors system that uses AI/Machine-Learning module for real-time interpretation of stylus movements implemented over a blockchain network consistent with the present disclosure.

Referring to FIG. 1B, the example diagram 100' includes the note book 101 with non-digital screens 114 (FIG. 1) and integrated laser projectors 112 use by a user 111. The note book 101 has a CPU 102 connected (optionally) to a cloud server node(s) 105 over a network. The CPU 102 is configured to host an AI/ML module 107 configured to generate a predictive model 108. The CPU 102 may receive stylus movement data as the user 111 moves the stylus.

The CPU 102 may query a stylus movements database 103 for the historical local stylus-related data based on the stylus movement data associated with the current user 111. The CPU 102 may acquire relevant remote stylus-related data from a remote database 106 residing on the cloud server 105. The stylus-related data in the database 106 may be collected from other styluses at different note books of the same type.

The CPU 102 may generate a feature vector or classifier data based on the stylus data and the collected heuristics data (i.e., pre-stored local data 103 and remote data 106). The CPU 102 may ingest the feature vector/classifier data into an AI/ML module 107. The AI/ML module 107 may generate a predictive model(s) 108 such as stylus movement interpretation predictive model based on the feature vector/classifier data to generate stylus movement parameters for automatic generation of the viewable content based on the plurality of stylus movement parameters. The stylus movement parameters may be further analyzed by the CPU 102 prior to the generation of the viewable content (drawings or text).

In one embodiment, as a second round of approval, a blockchain consensus may be achieved among the entities 102 and 105 in order to approve the stylus movement interpretation parameters generated by the CPU 102. The stylus 118 movement interpretation parameters may be stored on the ledger 109 of the blockchain 110.

Figure 2:
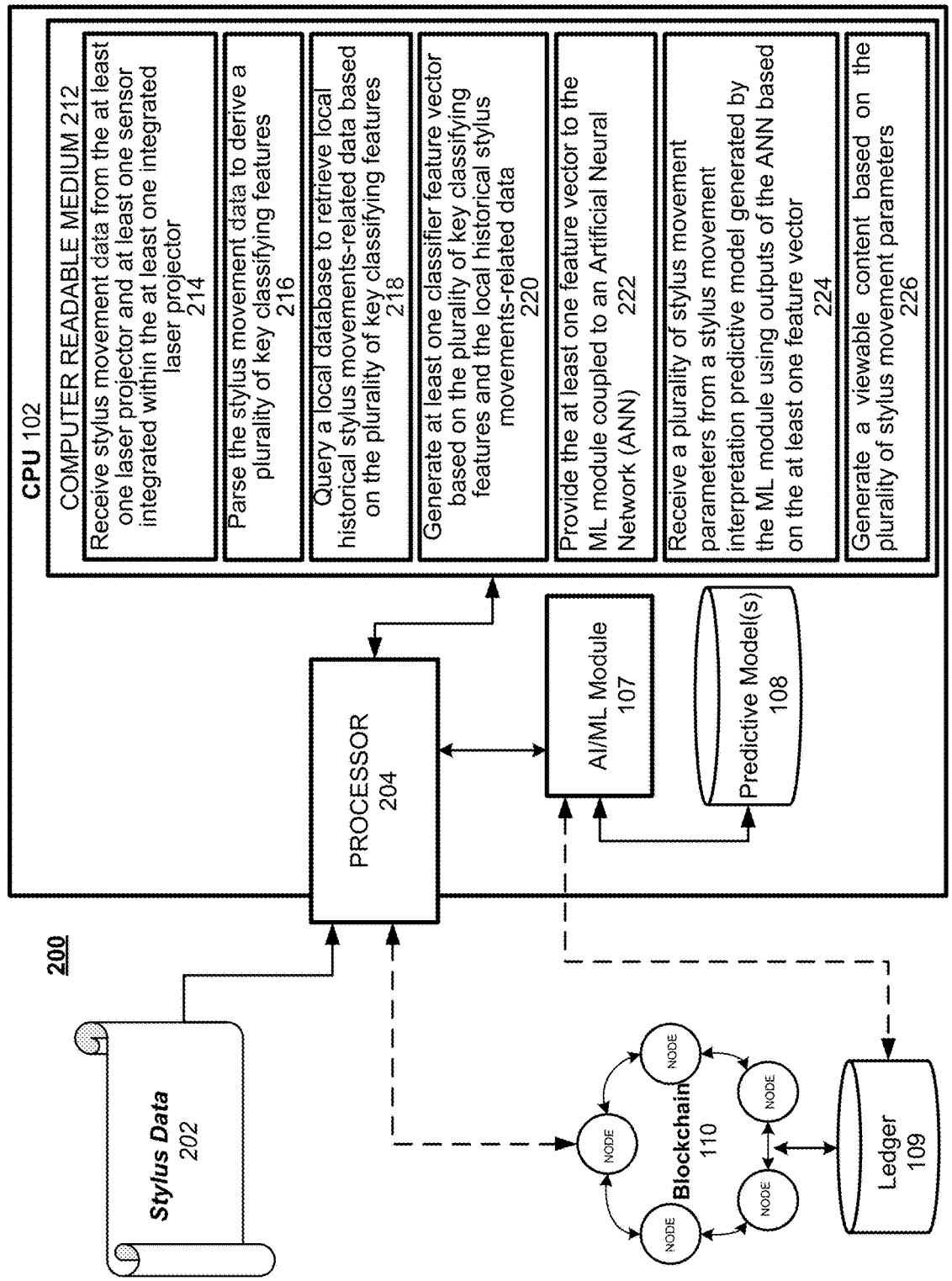
FIG. 2 illustrates a diagram of a note book with non-digital screens and integrated laser projectors and sensors system including detailed features of a CPU of the note book consistent with the present disclosure.

FIG. 2 illustrates a diagram of a note book with non-digital screens and integrated laser projectors and sensors system including detailed features of a CPU of the note book consistent with the present disclosure.

Referring to FIG. 2, the example network 200 includes the CPU 102 of the note book 101 connected to the laser projectors 112 with sensors (see FIGS. 1A-B) to receive the stylus data 202.

The CPU 102 is configured to host an AI/ML module 107. As discussed above with respect to FIGS. 1A-B, the CPU 102 may receive the stylus data 202 and pre-stored stylus-related data retrieved from the local and remote databases. As discussed above, the pre-stored stylus-related data may be retrieved from the ledger 109 of the permissioned blockchain 110.

The AI/ML module 107 may generate a predictive stylus movement interpretation predictive mode(s) 108 based on the received stylus movement data 202 provided by the CPU 102. As discussed above, the AI/ML module 107 may provide predictive outputs data in the form of stylus movement interpretations for automatic generation or rendering of the viewable content. In one embodiment, the CPU 102 may process the predictive outputs data received from the AI/ML module 107 to generate or update the stylus movement interpretations.

In one embodiment, the CPU 102 may continually monitor the stylus movement data 202 (including sensory data) and may detect a parameter that deviates from a previous recorded parameter (or from a median reading value) by a margin that exceeds a threshold value pre-set for this particular parameter. Accordingly, once the threshold is met or exceeded by at least one parameter of the stylus-related data, the CPU 102 may provide the currently acquired stylus-related parameter to the AI/ML module 107 to generate an updated stylus movement interpretation parameter(s) based on the user 111-related data.

While this example describes in detail only one CPU 102, multiple such nodes may be connected to the network and to the blockchain 110. It should be understood that the CPU 102 may include additional components and that some of the components described herein may be removed and/or modified without departing from a scope of the CPU 102 disclosed herein. The CPU 102 may may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the CPU 102 may include multiple processors, multiple cores, or the like, without departing from the scope of the CPU 102 system.

The CPU 102 may also include a non-transitory computer readable medium 212 that may have stored thereon machine-readable instructions executable by the processor 204. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to receive stylus 118 movement data from the at least one laser projector 112 and at least one sensor integrated within the at least one integrated laser projector 112 (FIG. 1 and FIGS. 1A-B). The processor 204 may fetch, decode, and execute the machine-readable instructions 216 to parse the stylus movement data to derive a plurality of key classifying features. The processor 204 may fetch, decode, and execute the machine-readable instructions 218 to query a local database to retrieve local historical stylus movements-related data based on the plurality of key classifying features. The processor 204 may fetch, decode, and execute the machine-readable instructions 220 to generate at least one classifier feature vector based on the plurality of key classifying features and the local historical stylus movements-related data.

The processor 204 may fetch, decode, and execute the machine-readable instructions 222 to provide the at least one feature vector to the ML module 107 coupled to an Artificial Neural Network (ANN). The processor 204 may fetch, decode, and execute the machine-readable instructions 224 to receive a plurality of stylus movement parameters from a stylus movement interpretation predictive model 108 generated by the ML module 107 using outputs of the ANN based on the at least one feature vector. The processor 204 may fetch, decode, and execute the machine-readable instructions 226 to generate or render a viewable content based on the plurality of stylus movement parameters.

The permissioned blockchain 110 may be configured to use one or more smart contracts that manage transactions for multiple participating nodes and for recording the transactions on the ledger 109.

Figure 3A:
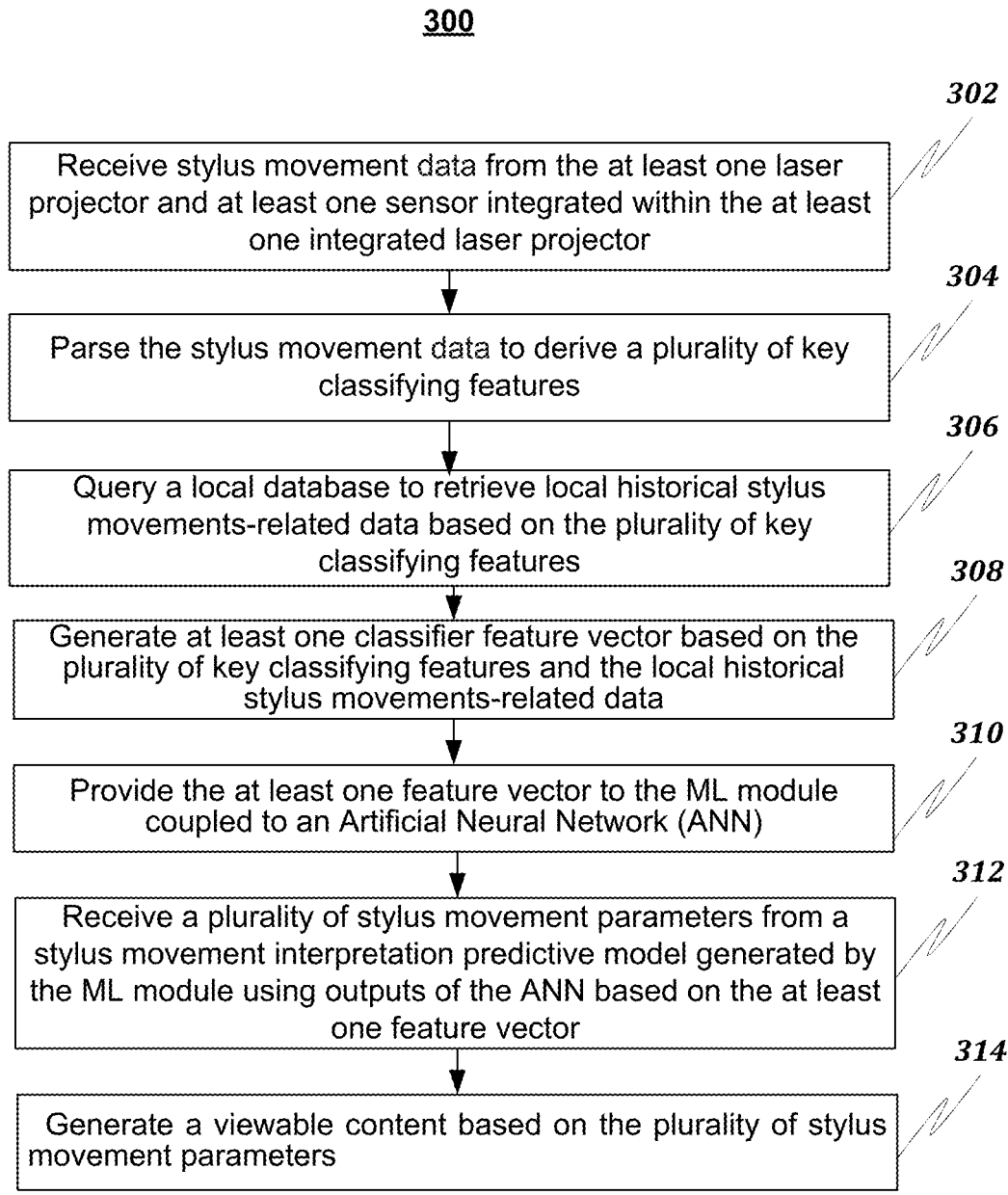
FIG. 3A illustrates a flowchart of a method for AI-based real-time interpretation of movements of the stylus and content projection onto non-digital screens consistent with the present disclosure.

FIG. 3A illustrates a flowchart of a method for AI-based real-time interpretation of movements of the stylus and content projection onto non-digital screens consistent with the present disclosure.

Referring to FIG. 3A, the method 300 may include one or more of the steps described below. FIG. 3A illustrates a flow chart of an example method executed by the CPU 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the CPU 102 may execute some or all of the operations included in the method 300.

With reference to FIG. 3A, at block 302, the processor 204 may receive stylus movement data from the at least one laser projector and at least one sensor integrated within the at least one integrated laser projector. At block 304, the processor 204 may parse the stylus movement data to derive a plurality of key classifying features. At block 306, the processor 204 may query a local database to retrieve local historical stylus movements-related data based on the plurality of key classifying features. At block 308, the processor 204 may generate at least one classifier feature vector based on the plurality of key classifying features and the local historical stylus movements-related data. At block 310, the processor 204 may provide the at least one feature vector to the ML module coupled to an Artificial Neural Network (ANN). At block 312, the processor 204 may receive a plurality of stylus movement parameters from a stylus movement interpretation predictive model generated by the ML module using outputs of the ANN based on the at least one feature vector. At block 314, the processor 204 may generate a viewable content based on the plurality of stylus movement parameters.

Figure 3B:
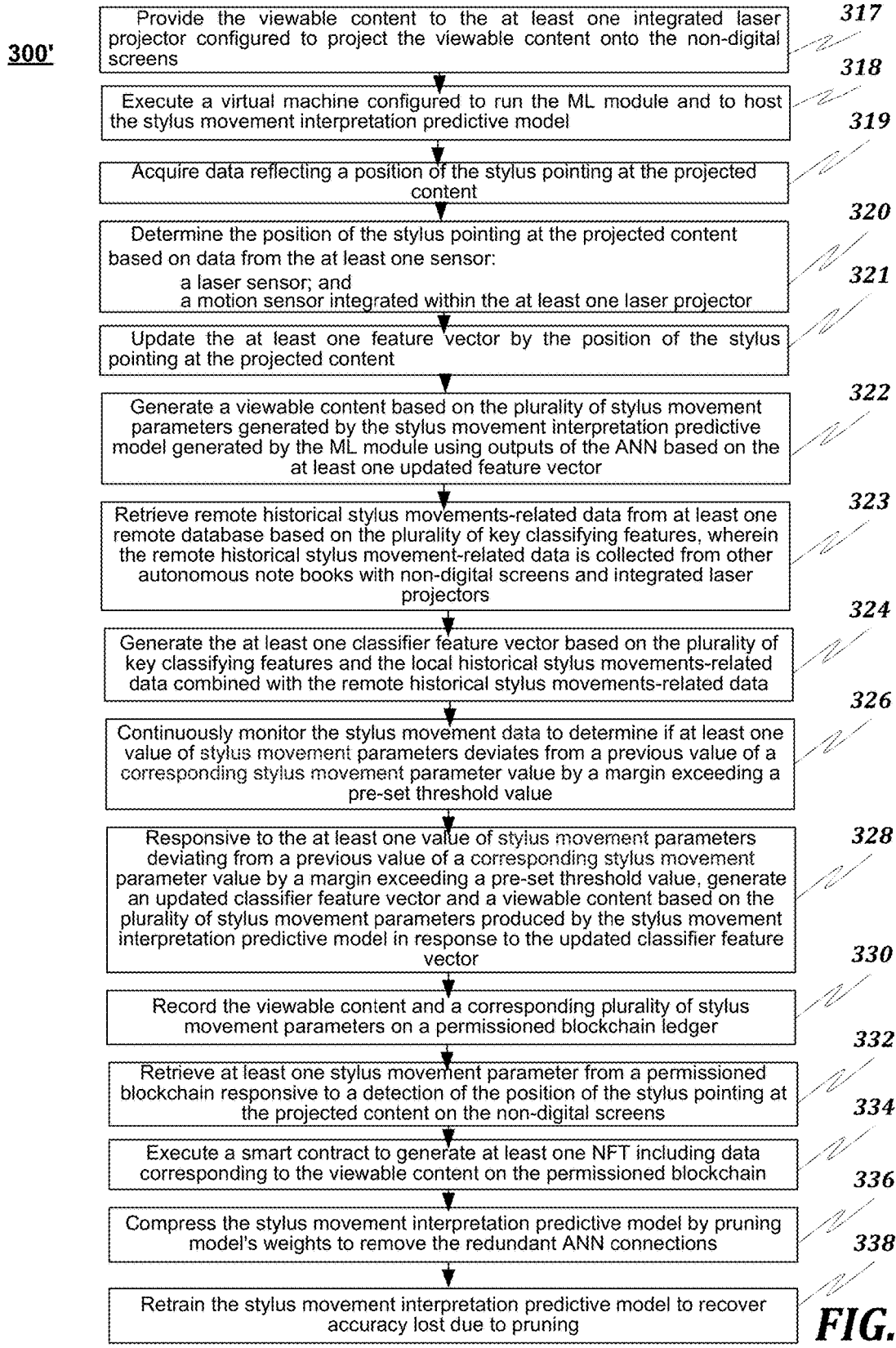
FIG. 3B illustrates a further flowchart of a method for AI-based real-time interpretation of movements of the stylus and content projection onto non-digital screens consistent with the present disclosure.

FIG. 3B illustrates a further flowchart of a method for AI-based real-time interpretation of movements of the stylus and content projection onto non-digital screens consistent with the present disclosure.

Referring to FIG. 3B, the method 300' may include one or more of the steps described below. FIG. 3B illustrates a flow chart of an example method executed by the CPU 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the TPS 102 may execute some or all of the operations included in the method 300'.

With reference to FIG. 3B, at block 317, the processor 204 may provide the viewable content to the at least one integrated laser projector configured to project the viewable content onto the non-digital screens.

At block 318, the processor 204 may execute a virtual machine configured to run the ML module and to host the stylus movement interpretation predictive model. At block 319, the processor 204 may acquire data reflecting a position of the stylus pointing at the projected content. At block 320, the processor 204 may determine the position of the stylus pointing at the projected content based on data from the at least one sensor: a laser sensor; and a motion sensor integrated within the at least one laser projector.

At block 321, the processor 204 may update the at least one feature vector by the position of the stylus pointing at the projected content. At block 322, the processor 204 may generate a viewable content based on the plurality of stylus movement parameters generated by the stylus movement interpretation predictive model generated by the ML module using outputs of the ANN based on the at least one updated feature vector. At block 323, the processor 204 may retrieve remote historical stylus movements-related data from at least one remote database based on the plurality of key classifying features, wherein the remote historical stylus movement-related data is collected from other autonomous note books with non-digital screens and integrated laser projectors.

At block 324, the processor 204 may generate the at least one classifier feature vector based on the plurality of key classifying features and the local historical stylus movements-related data combined with the remote historical stylus movements-related data.

At block 326, the processor 204 may continuously monitor the stylus movement data to determine if at least one value of stylus movement parameters deviates from a previous value of a corresponding stylus movement parameter value by a margin exceeding a pre-set threshold value. At block 328, the processor 204 may, responsive to the at least one value of stylus movement parameters deviating from a previous value of a corresponding stylus movement parameter value by a margin exceeding a pre-set threshold value, generate an updated classifier feature vector and a viewable content based on the plurality of stylus movement parameters produced by the stylus movement interpretation predictive model in response to the updated classifier feature vector. At block 330, the processor 204 may record the viewable content and a corresponding plurality of stylus movement parameters on a permissioned blockchain ledger. At block 332, the processor 204 may retrieve at least one stylus movement parameter from a permissioned blockchain responsive to a detection of the position of the stylus pointing at the projected content on the non-digital screens.

At block 334, the processor 204 may execute a smart contract to generate at least one NFT including data corresponding to the viewable content on the permissioned blockchain. At block 336, the processor 204 may compress the stylus movement interpretation predictive model by pruning model's weights to remove the redundant ANN connections. At block 338, the processor 204 may retrain the stylus movement interpretation predictive model to recover accuracy lost due to pruning.

The stylus movement parameters used in training data sets may be stored in a centralized local database (such as one used for storing local data 103 depicted in FIGS. 1A-B). In one embodiment, an ANNN may be used in the AI/ML module 107 for the stylus movement parameters' modeling and generation of a viewable content.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 102 and 105 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing parameters and a viewable content, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

Figure 4:
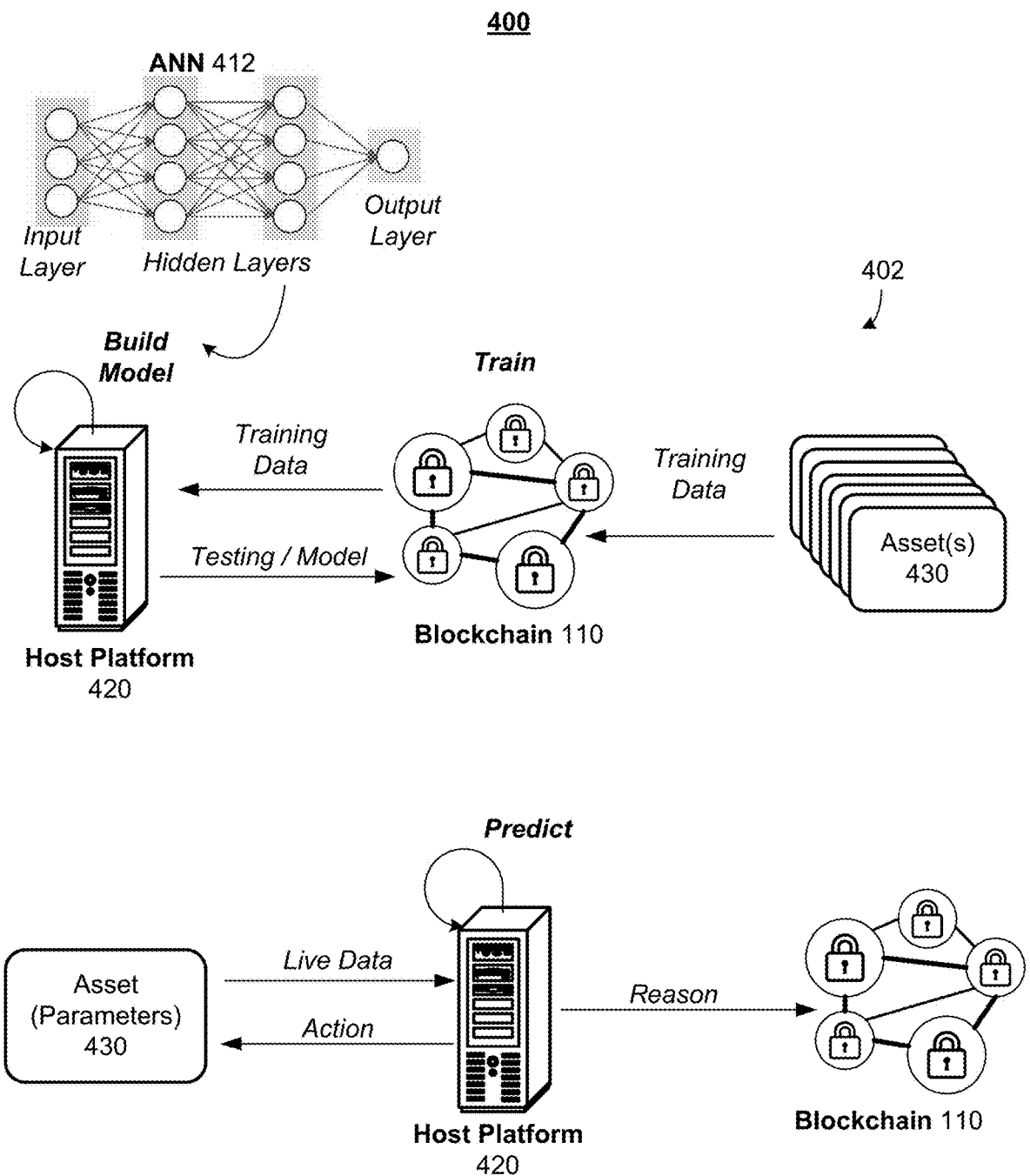
FIG. 4 illustrates deployment of a machine learning model for prediction of visual content rendering parameters using blockchain assets consistent with the present disclosure.

In the example depicted in FIG. 4, a host platform 420 (such as the CPU 102) builds and deploys a machine learning model for predictive monitoring of assets 430. Here, the host platform 420 may be a cloud platform, an industrial server, a web server, a personal computer, a user device, and the like. Assets 430 can represent stylus movement parameters. The blockchain 110 can be used to significantly improve both a training process 402 of the machine learning model and the stylus movement parameters' predictive process 405 based on a trained machine learning model that uses outputs of the ANN 412. For example, in 402, rather than requiring a data scientist/engineer or other user to collect the data, historical data (heuristics—i.e., stylus movements-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the CPU 102 or from the databases 103 and 106 depicted in FIGS. 1A-1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This, advantageously, provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make recommendation-related predictions/decisions based on the execution of the final trained machine learning model using the prediction parameters. In this example, data fed back from the asset 430 may be input into the machine learning model and may be used to make event predictions such as stylus movement interpretation parameters parameters based on the recorded stylus-related data. Determinations made by the execution of the machine learning model (e.g., approval of stylus movements, etc.) at the host platform 420 may be stored on the blockchain 110 to provide auditable/verifiable proof. As one non-limiting example, the machine learning model may predict a future change of a part of the asset 430 (the stylus movement interpretation parameters parameters). The data behind this decision may be stored by the host platform 420 on the blockchain 110.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
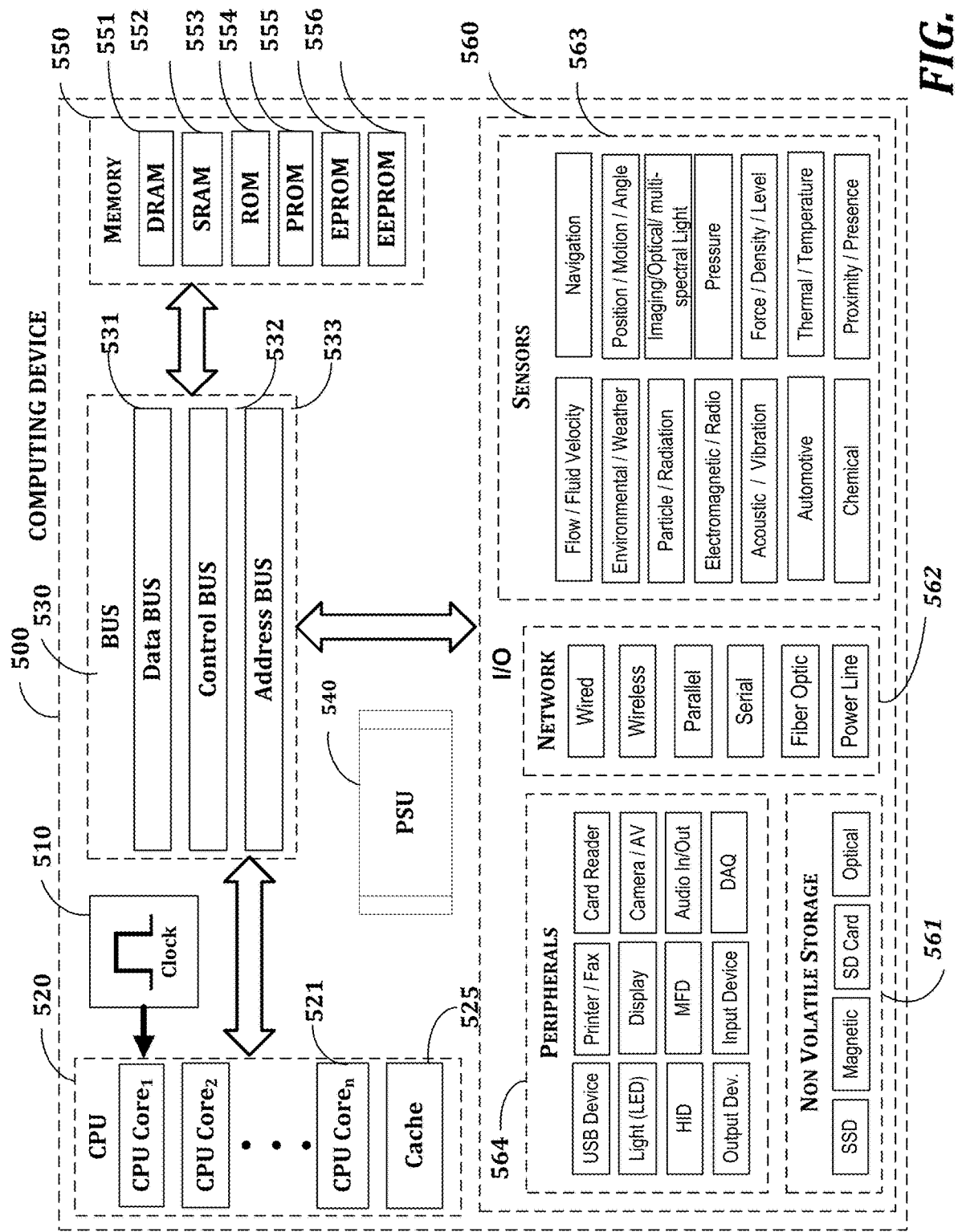
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The CPU 102 (see FIG. 2) may be hosted on a centralized server or on a cloud computing service. Although method 300 has been described to be performed by the CPU 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the CPU 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (TPS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical TPS sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust TPS/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical TPS sensor, fish counter, frequency domain sensor, TPS detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, TPS meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust TPS temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to, microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC). Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. An autonomous note book with non-digital screens, comprising:
   a plurality of integrated laser projectors located on the non-digital screens and connected to a machine-learning (ML) module configured to interpret movements of stylus over the non-digital screens and to generate printable transcribed text or drawings;
   a processor of the autonomous note book configured to run the ML module and connected to at least one integrated laser projector from the plurality of integrated laser projectors and to at least one sensor; and
   a memory on which are stored machine-readable instructions that when executed by the processor, cause the processor to:
      receive stylus movement data from the at least one laser projector and at least one sensor integrated within the at least one integrated laser projector;
      parse the stylus movement data to derive a plurality of key classifying features;
      query a local database to retrieve local historical stylus movements-related data based on the plurality of key classifying features;
      generate at least one classifier feature vector based on the plurality of key classifying features and the local historical stylus movements-related data;
      provide the at least one feature vector to the ML module coupled to an Artificial Neural Network (ANN);
      receive a plurality of stylus movement parameters from a stylus movement interpretation predictive model generated by the ML module using outputs of the ANN based on the at least one feature vector; and
      generate a viewable content based on the plurality of stylus movement parameters.

2. The system of claim 1, wherein the machine-readable instructions that when executed by the processor, cause the processor to provide the viewable content to the at least one integrated laser projector configured to project the viewable content onto the non-digital screens.

3. The system of claim 1, wherein the machine-readable instructions that when executed by the processor, cause the processor to execute a virtual machine configured to run the ML module and to host the stylus movement interpretation predictive model.

4. The system of claim 1, wherein the machine-readable instructions that when executed by the processor, cause the processor to acquire data reflecting a position of the stylus pointing at the projected content.

5. The system of claim 4, wherein the machine-readable instructions that when executed by the processor, cause the processor to determine the position of the stylus pointing at the projected content based on data from the at least one sensor:
   a laser sensor; and
   a motion sensor integrated within the at least one laser projector.

6. The system of claim 4, wherein the machine-readable instructions that when executed by the processor, cause the processor to update the at least one feature vector by the position of the stylus pointing at the projected content.

7. The system of claim 6, wherein the machine-readable instructions that when executed by the processor, cause the processor to generate a viewable content based on the plurality of stylus movement parameters generated by the stylus movement interpretation predictive model generated by the ML module using outputs of the ANN based on the at least one updated feature vector.

8. The system of claim 6, wherein the machine-readable instructions that when executed by the processor, further cause the processor to retrieve at least one stylus movement parameter from a permissioned blockchain responsive to a detection of the position of the stylus pointing at the projected content on the non-digital screens.

9. The system of claim 1, wherein the machine-readable instructions that when executed by the processor, cause the processor to retrieve remote historical stylus movements-related data from at least one remote database based on the plurality of key classifying features, wherein the remote historical stylus movement-related data is collected from other autonomous note books with non-digital screens and integrated laser projectors.

10. The system of claim 9, wherein the machine-readable instructions that when executed by the processor, cause the processor to generate the at least one classifier feature vector based on the plurality of key classifying features and the local historical stylus movements-related data combined with the remote historical stylus movements-related data.

11. The system of claim 10, wherein the machine-readable instructions that when executed by the processor, further cause the processor to execute a smart contract to generate at least one NFT including data corresponding to the viewable content on the permissioned blockchain.

12. The system of claim 1, wherein the machine-readable instructions that when executed by the processor, cause the processor to continuously monitor the stylus movement data to determine if at least one value of stylus movement parameters deviates from a previous value of a corresponding stylus movement parameter value by a margin exceeding a pre-set threshold value.

13. The system of claim 12, wherein the machine-readable instructions that when executed by the processor, cause the processor to, responsive to the at least one value of stylus movement parameters deviating from a previous value of a corresponding stylus movement parameter value by a margin exceeding a pre-set threshold value, generate an updated classifier feature vector and a viewable content based on the plurality of stylus movement parameters produced by the stylus movement interpretation predictive model in response to the updated classifier feature vector.

14. The system of claim 1, wherein the machine-readable instructions that when executed by the processor, further cause the processor to record the viewable content and a corresponding plurality of stylus movement parameters on a permissioned blockchain ledger.

15. The system of claim 1, wherein the machine-readable instructions that when executed by the processor, further cause the processor to compress the stylus movement interpretation predictive model by pruning model's weights to remove the redundant ANN connections.

16. The system of claim 15, wherein the machine-readable instructions that when executed by the processor, further cause the processor to retrain the stylus movement interpretation predictive model to recover accuracy lost due to pruning.

17. A method for AI-based real-time interpretation of movements of the stylus and content projection onto non-digital screens of an autonomous note book, comprising:
receiving, by a processor of the autonomous note book configure to host a machine learning (ML) module, stylus movement data from the at least one laser projector and at least one sensor integrated within the at least one integrated laser projector;
parsing, by the processor, the stylus movement data to derive a plurality of key classifying features;
querying, by the processor, a local database to retrieve local historical stylus movements-related data based on the plurality of key classifying features;
generating, by the processor, at least one classifier feature vector based on the plurality of key classifying features and the local historical stylus movements-related data;
providing, by the processor, the at least one feature vector to the ML module coupled to an Artificial Neural Network (ANN);
receiving, by the processor, a plurality of stylus movement parameters from a stylus movement interpretation predictive model generated by the ML module using outputs of the ANN based on the at least one feature vector; and
generating, by the processor, a viewable content based on the plurality of stylus movement parameters.

18. The method of claim 17, further comprising to continuously monitoring the stylus movement data to determine if at least one value of stylus movement parameters deviates from a previous value of a corresponding stylus movement parameter value by a margin exceeding a pre-set threshold value.

19. The method of claim 18, further comprising, responsive to the at least one value of stylus movement parameters deviating from a previous value of a corresponding stylus movement parameter value by a margin exceeding a pre-set threshold value, generating an updated classifier feature vector and a viewable content based on the plurality of stylus movement parameters produced by the stylus movement interpretation predictive model in response to the updated classifier feature vector.

20. A non-transitory computer-readable medium comprising instructions, that when read by a processor, cause the processor to perform:
receiving stylus movement data from the at least one laser projector and at least one sensor integrated within the at least one integrated laser projector;
parsing the stylus movement data to derive a plurality of key classifying features;
querying a local database to retrieve local historical stylus movements-related data based on the plurality of key classifying features;
generating at least one classifier feature vector based on the plurality of key classifying features and the local historical stylus movements-related data;
providing the at least one feature vector to a machine learning (ML) module coupled to an Artificial Neural Network (ANN);
receiving a plurality of stylus movement parameters from a stylus movement interpretation predictive model generated by the ML module using outputs of the ANN based on the at least one feature vector; and
generating a viewable content based on the plurality of stylus movement parameters.

* * * * *